United States Patent [19]

Nilsson

[11] Patent Number: 5,407,455

[45] Date of Patent: Apr. 18, 1995

[54] REACTOR FOR GASIFICATION OF CELLULOSE-WASTE LIQUORS ESPECIALLY BLACK LIQUOR

[75] Inventor: Bengt Nilsson, Skoghall, Sweden

[73] Assignee: Chemrec AB, Karlstad, Sweden

[21] Appl. No.: 126,716

[22] Filed: Sep. 27, 1993

[30] Foreign Application Priority Data

Jun. 10, 1993 [SE] Sweden .................... 9301990

[51] Int. Cl.⁶ .................. C10J 3/00; C10J 3/48; C10J 3/74

[52] U.S. Cl. ...................... 48/61; 48/62 R; 48/76; 48/107; 48/111; 422/185; 422/239; 422/241

[58] Field of Search ............. 48/61, 62, 67, 76, 127.9, 48/, 107, 111, 68, 69, 63, 64; 422/185, 239, 240, 241, 242; 110/238, 254; 122/7 C; 162/30.1, 30.11

[56] References Cited

U.S. PATENT DOCUMENTS

| 2,011,034 | 8/1935 | Chilowsky | 48/107 |
|---|---|---|---|
| 2,535,730 | 12/1950 | Gadret | 422/185 |
| 2,538,059 | 1/1951 | Strunk | 422/241 |
| 2,739,878 | 3/1906 | Jolley | 48/76 |
| 2,823,243 | 2/1958 | Robinson | 48/127.7 |
| 3,048,481 | 8/1962 | Eastman | 422/241 |
| 3,297,777 | 1/1967 | Grantom et al. | 48/107 |
| 4,305,732 | 12/1981 | Koenig et al. | 48/67 |
| 4,710,202 | 12/1987 | Gohler et al. | 48/76 |
| 5,063,028 | 11/1991 | Humble et al. | 422/246 |
| 5,087,270 | 2/1992 | Gateau et al. | 48/127.9 |

FOREIGN PATENT DOCUMENTS

| 363652 | 5/1906 | France | 48/107 |
|---|---|---|---|
| 155429 | 6/1982 | Germany | 422/241 |
| 2296623 | 2/1992 | United Kingdom | 110/238 |
| 1104148 | 7/1984 | U.S.S.R. | 48/61 |

*Primary Examiner*—Peter Kratz
*Attorney, Agent, or Firm*—Birch, Stewart, Kolasch & Birch

[57] ABSTRACT

A reactor for gasification of cellulose-waste liquors, especially black liquor. The reactor includes a reactor cladding a supply for liquor and combustion air in the upper part of the reactor, an outlet opening for gases and other material in the lower part, and a heat-insulating lining at the cladding and bottom part. The lining is arranged at a distance from the surrounding wall, thereby forming a gap for gas or air having a pressure exceeding that in the hearth of the reactor.

10 Claims, 4 Drawing Sheets

REACTOR FOR GASIFICATION OF CELLULOSE-WASTE LIQUORS ESPECIALLY BLACK LIQUOR

FIELD OF THE INVENTION

The present invention relates to a reactor for gasification of cellulose-waste liquors, especially black liquor which contains inorganic alkalies. The reactor is intended to be included in a system for the recovery of chemicals and energy from waste liquors from cellulose cooking, especially according to the sulphate method.

PRIOR ART

Systems and reactors for gasification of cellulose-waste liquors, especially black liquor are known. They are based on gasifying the liquor in a reactor whereby the liquor is atomised and subjected to a flash pyrolysis under formation of mainly $CO$, $CO_2$, $CH_4$, $H_2$, $H_2S$, $Na_2CO_3$ and $Na_2S$. The pressure ranges from atmospheric pressure up to 150 bar.

The pyrolysis reactions are endothermic and thus air is introduced in the vicinity of the injection of the liquor for combustion of a part of the gas which is formed during the pyrolysis of the organic material.

The injection and combustion occur in the upper part of the reactor and the pyrolysed and burnt material, together with droplets of inorganic chemicals mainly containing $Na_2CO_3$ and $Na_2S$, are fed out and cooled in the bottom part of the reactor.

The inorganic chemicals are collected and the combustionable gases are further burnt for creating heat-energy. This gasification recovery of chemicals and energy is described further in Swedish patent 8502731-6.

THE TECHNICAL PROBLEM

The reactor in which the gasification occurs consists of a cladding of, for example, steel which is lined with a resistant material, for example bricks or ceramics. The brick-lined reactor can be provided with built-in cooling pipes for controlling of the wall temperature.

During the gasification gassed alkali/alkali compounds are obtained in the reactor which penetrate the joints of the lining, fractures in the lining material and any expansion cavities. This means that penetratable spaces having a lower temperature are filled with condensed or sublimated alkali compounds creating a concrete-like mass. Due to this, expansion and insulating spaces which are necessary for the lining are eliminated.

SUMMARY OF THE INVENTION

A solution to the problem of alkali and alkali compounds penetrating into and behind the lining has been sought for a long while and thus, according to the invention, a reactor is provided for gasification and partial combustion at a temperature exceeding 600° C., preferably between 900° C. and 1300° C., of cellulose-waste liquors, especially black liquor containing inorganic alkalies, comprising a reactor cladding, supply means for liquor and combustion air preferably in the upper part of the reactor, an outlet opening for gases and other material preferably in the lower part, and a heat-insulating lining, which reactor is characterized in that the lining is arranged at a distance from the surrounding wall thereby creating a gap for gas and air having a pressure exceeding that in the reactor hearth.

The reactor according to the invention is further characterized in that the inlet openings communicating with the gap are arranged in the lower part of the cladding or the bottom part for the supply of secondary air, tertiary air or destruction gas.

The reactor can, according to the invention, also be provided with a ring-gap communicating with the upper part of the gap for the outlet of the overpressure gases into the reactor hearth around the supply means for the liquor.

The reactor can also be arranged according to the invention so that the entire air supply to the reactor is intended to occur via the gap.

The reactor can, however, according to the invention also be arranged so that a part of the air supply to the reactor is intended to occur via the gap, while a part is intended to occur in a conventional way directly into the upper part of the reactor.

It is, according to the invention, suitable that the inlet openings are arranged in the bottom part and that this is provided with distribution channels for the air or gas.

The lining in the reactor can, according to the invention, suitably consist of an inner wearing lining of a prefabricated ceramic material and an outer lining cast-in-situ also of ceramic material.

The inner prefabricated wearing lining is, according to the invention, suitably composed and accordingly comprises joints.

The outer lining cast-in-situ can, according to the invention, comprise air channels forming the gap.

It is further, according to the invention, suitable that the lining consists of an inner wearing lining of a prefabricated ceramic material and one or more outer layers of ceramic felt.

According to an embodiment of the invention, insulation can be arranged on the inner side of the cladding, which insulation is supported at the inner side by a corrugated plate which forms the gap together with the rear or wearing lining.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described further in the following in connection with the attached drawings wherein.

DETAILED DESCRIPTION OF THE PREFERRED EMBODIMENTS

Several embodiments of the invention will be described in more detail in the following.

Figure 1:
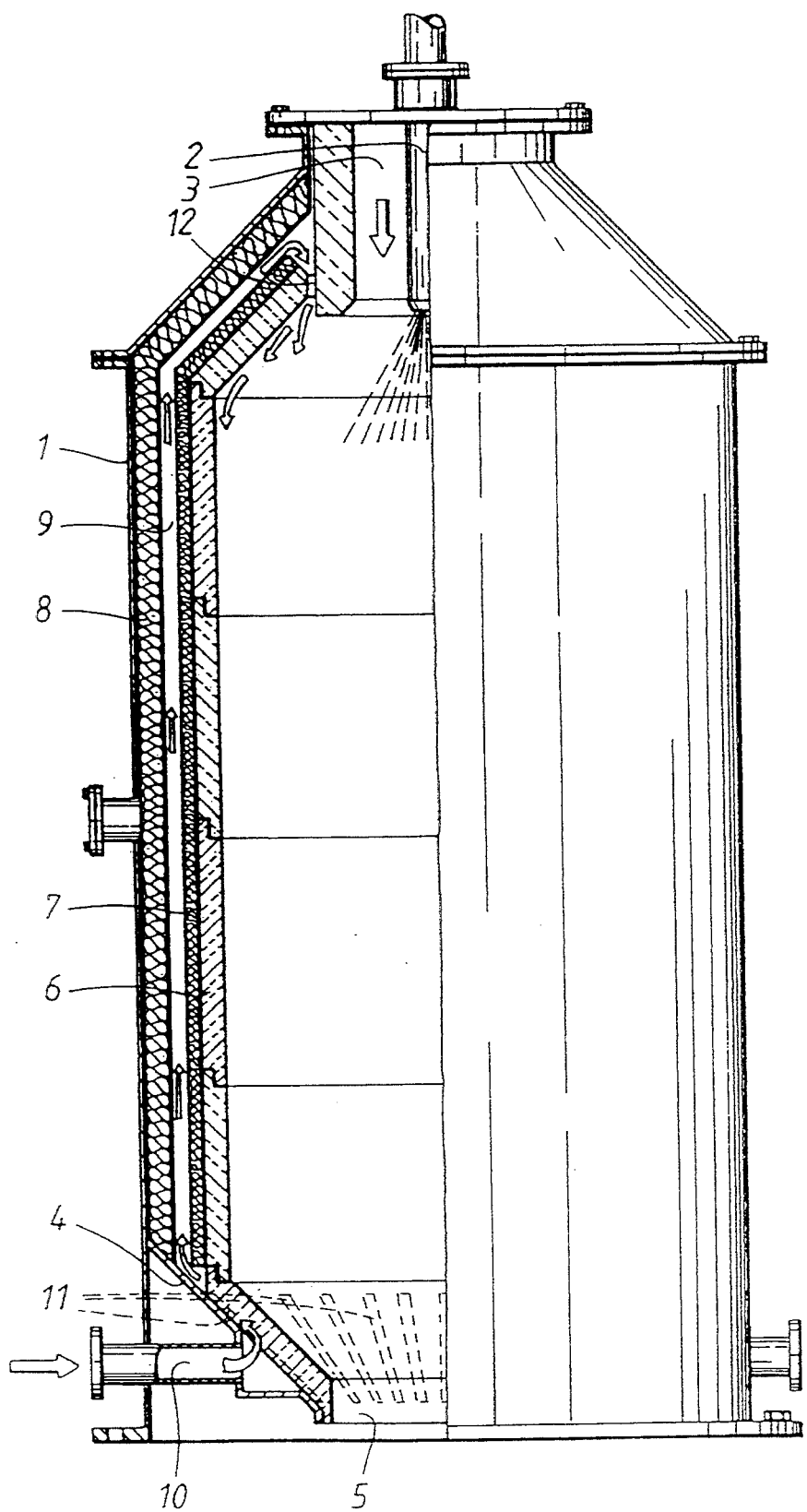
FIG. 1 is a vertical section showing an embodiment of the invention, FIG. 2 also is a vertical section which shows another embodiment of the invention.

FIG. 1 shows one half of a reactor according to the invention with a cladding 1, an injection device 2 for black liquor and an inlet opening 3 for so-called secondary air intended for partial combustion of the organic substances. In the bottom part 4 of the reactor, an outlet opening 5 for gases and droplets of chemicals is arranged.

In the reactor closest to the reactor hearth there is arranged a wearing lining 6. Outside this wearing lining 6 there is arranged a ceramic felt 7 and outside this at some distance a further ceramic felt 8 in contact with the cladding wall 1. Between these ceramic felt layers a gap 9 is accordingly formed. According to the invention, the .gap is intended to contain air or gases at a higher pressure than the pressure which exists in the reactor hearth. In this way, penetration of melted materials in joints and open pores in the lining 6 or penetrating of gasified alkali/alkali-compound is effectively prevented. This makes it possible for the lining 6 to be prefabricated and to consist of rings having incompletely sealed joints.

To create the pressure in the gap 9, according to the present embodiment an inlet opening is arranged for air at the ceramic bottom cone. This bottom cone can be provided with distribution channels 11 for the air.

The gap 9 terminates at its upper part in a ring gap 12 around the injection device and the air input for the secondary air. This ring-gap can be a type of gas nozzle ring and it allows a flow of the gas in the gap 9 into the reactor hearth since the gas in the gap 9 has a higher pressure than the pressure which exists in the reactor hearth.

The air which, according to the present embodiment, is fed into the reactor accordingly consists of secondary air through the opening 3 and tertiary air through the gap 9 and the ring gap 12. The tertiary air through the gap 9 will be heated up and accordingly give a desired cooling of the outer parts of the lining and hence improved heat economy.

Figure 2:
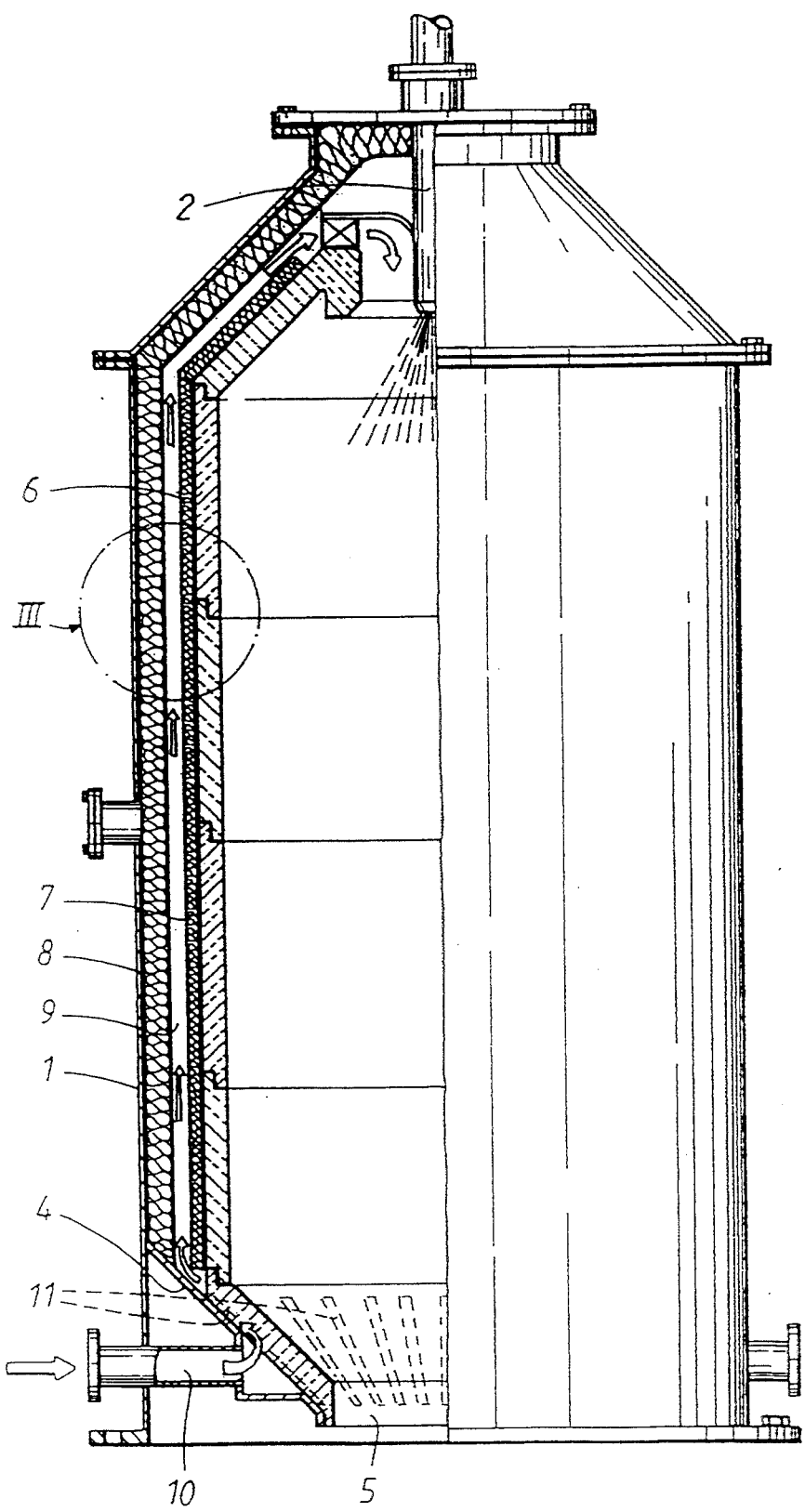

FIG. 2 shows another embodiment of the reactor according to FIG. 1. These embodiments are in principle the same, though with the exception that the entire quantity of secondary air is blown in via the inlet 10 and the gap 9. The gap 9 will then at its upper end open into an inlet opening which corresponds to the inlet opening for air 3 according to FIG. 1. In this way, the entire secondary air is preheated and a simplified construction in the upper part of the reactor is attained.

Through the embodiments according to FIG. 1 and 2, a number of advantages is obtained i.e. a controlled heat loss which is used for preheating of the combustion air, preventing alkali penetration through primarily joints and fractures due to the over-pressure between the steel cladding and the lining, and simplified construction of the reactor as well as lining, ensuring that both radial and axial expansion space for the lining will exist.

The simplified lining is achieved only through a ceramic lining, whereby a so-called rear lining is made up of a ceramic isolating mat. This permits a simplified mounting and demounting of worn linings. The ceramic lining can be shaped as rings. It can also exist in vertical segments whereby vertical joints are obtained.

The reactor itself is simplified since the air intake in the upper part disappears when the whole amount of the secondary air is blown in through the bottom part. The previous water cooling of the bottom part which was necessary can also be avoided since the air cooling also comprises the bottom part.

Figure 3:
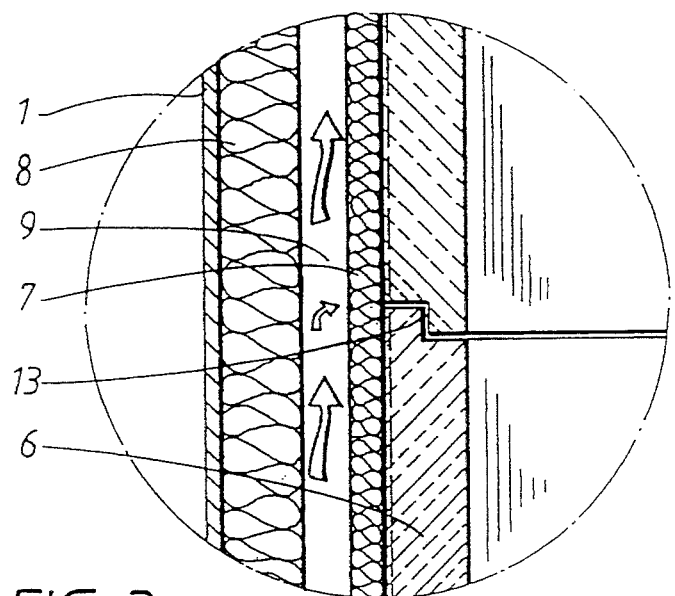
FIG. 3 is a vertical section showing an enlarged view through the reactor wall and the lining.

FIG. 3 shows an enlargement of a wall section according to the embodiment shown in FIGS. 1 and 2. The same reference denotations apply as in FIGS. 1 and 2. A joint 13 between the rings is clearly shown and this joint does not have to be made one hundred percent sealed since a one-way traffic exists due to overpressure in the gap 9 compared to the reactor hearth.

Figure 4:
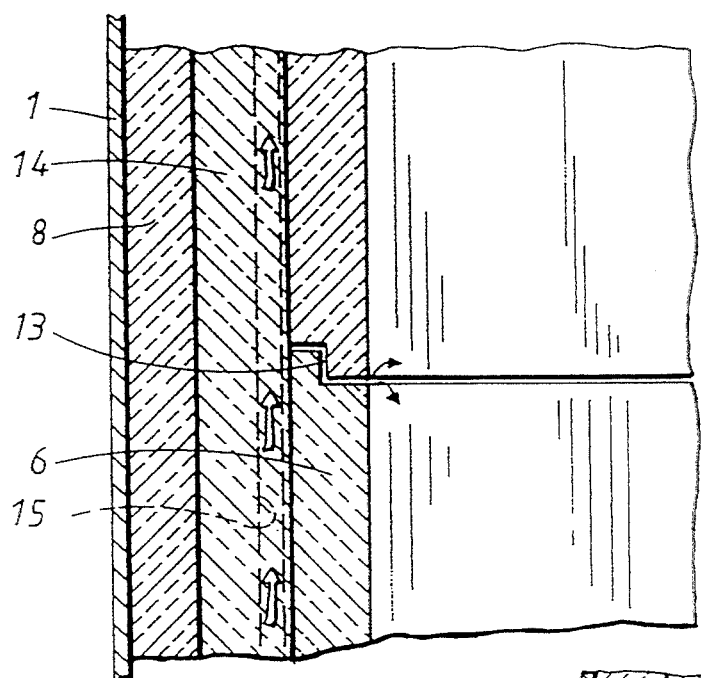
FIG. 4 shows another embodiment of the wall and the lining.
Figure 5:
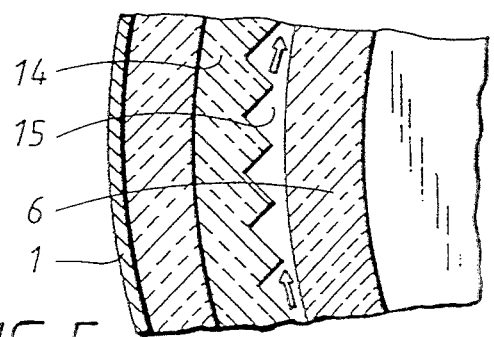
FIG. 5 shows a horizontal section of the wall and the lining.

FIG. 4 is a vertical section and FIG. 5 is a horizontal section which show a further embodiment of the invention. Outside the lining 6 which is prefabricated an insulating layer 14 cast-in-situ has been arranged. This layer has been provided at its inner side with triangular or semicircular—corrugated shaped—channels 15 forming the gap 9.

Figure 6:
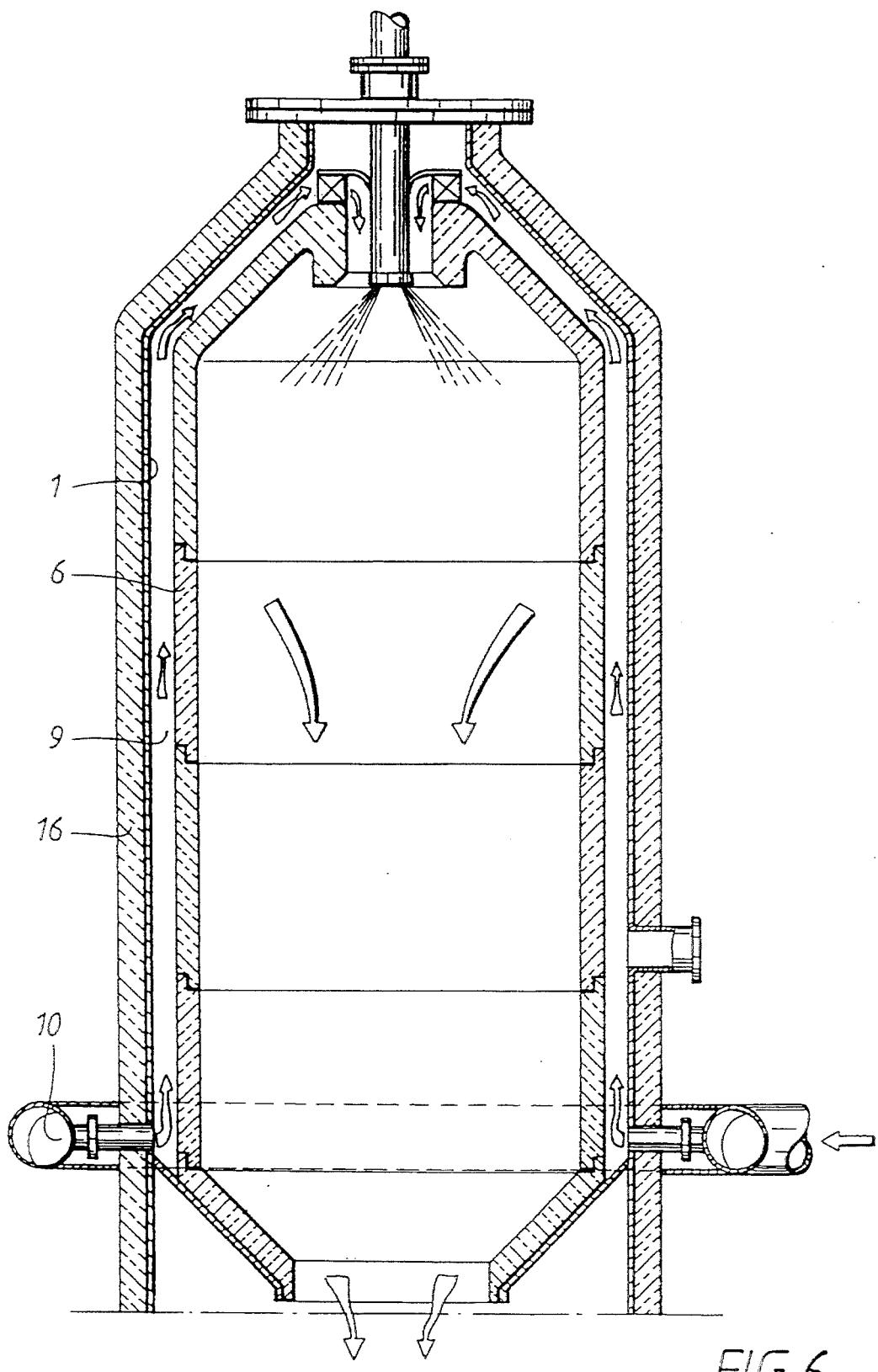
FIG. 6 shows a further embodiment of the invention.

Finally, FIG. 6 shows a further embodiment of the invention. According to this embodiment the overpressure gap 9 is located directly inside the steel cladding 1 and one single layer of a prefabricated insulation 6 exists inside the gap 9. This ensures that the secondary air, which in this case is blown in through the air intake 10 at the lower part of the cylindric plate cladding, will be maximally heated. To prevent unnecessary heat losses, the plate cladding 1 has at the outer side been provided with heat insulation in the form of a ceramic felt 16.

The embodiment according to FIG. 6 is also provided with a rear lining around the inner lining and the air gap 9 is arranged between the rear lining and cladding. A quantity of the secondary air can also be allowed to flow into the reactor from above in a conventional way. Further, a part of the air flow through the gap 9 can be added as tertiary air at some distance down in the reactor.

Further embodiments are also possible. For example, one or several insulating mats can be arranged at the inner side of the cladding, which mats are supported by a corrugated plate on the inner side. This plate can, together with the inside located lining, form the gap 9. The plate can suitably consist of stainless steel having a bright surface for reflection of heat.

It is not necessary that pure tertiary or secondary air be blown in through the lower air intakes but so-called destruction gas, which is included in the system, can also be preheated and blown in through the gap 9.

By means of the present invention, two problems are solved, namely the problem with gasified alkali which penetrates through the lining and the problem of preheating the supplied air or destruction gas to the reactor is an optimal way. The temperature in the reactor is 700°–1300° C., normally 800°–900° C., which means that the heat losses can be rather substantial if the method is not carried out in an optimal way. One can for example obtain a temperature of the secondary air of approximately 400° C. if one lets it wholly flow through the gap 9 which means a substantial gain of heat.

The invention is not limited to the embodiment examples shown but can be varied in different ways within the scope of the claims.

I claim:

1. A reactor for gasification and partial combustion, at a temperature exceeding 600° C., of cellulose-waste liquors containing inorganic alkalies comprising:
   a reactor cladding;
   supply means for supplying liquor and combustion air disposed at an upper part of a reactor hearth;
   an outlet opening for gases and other material disposed in a lower part of said reactor; and
   a heat-insulating lining, including a plurality of wearing lining panels having joints formed therebetween, disposed radially inward of the cladding and a bottom part, wherein the lining is arranged at a distance from the surrounding cladding, thereby creating a radial gap between said cladding and said lining for overpressure gas or air having a pressure exceeding that in the reactor hearth, such that overpressure gas or air in said radial gap is forced into the reactor hearth through joints formed in said lining whereby combustion materials are prevented from entering said joints.

2. The reactor according to claim 1, wherein an inlet opening communicating with the radial gap is arranged in a lower part of the cladding and said bottom part for supply of said overpressure gas or air.

3. The reactor according to any of the claims 1 or 2, wherein a ring gap communicating with an upper part of the radial gap for outlet of said overpressure gas or air into the reactor hearth is arranged around the supply means for liquor and combustion air.

4. The reactor according to claim 1, wherein the entire air supply to the reactor occurs via said radial gap between said cladding and said lining.

5. The reactor according to claim 1, wherein a part of an air supply to the reactor enters via the radial gap, while a part of the air supply enters directly through the upper part of the reactor.

6. The reactor according to claim 2, wherein the inlet opening is provided with a plurality of distribution channels formed between said lining and said bottom part for entry of the overpressure air or gas into said radial gap.

7. The reactor according to claim 1, wherein the heat insulating lining is formed of prefabricated ceramic material and wherein an outer cast-in-situ rear lining also formed of ceramic material is disposed between the radial gap and the reactor cladding.

8. The reactor according to claim 7, wherein the outer cast-in-situ lining comprises air channels forming the radial gap.

9. The reactor according to claim 1, wherein the lining includes an inner wearing lining of ceramic material and at least one outer layer of ceramic felt.

10. The reactor according to claims 1 or 2, wherein on an inner surface of the cladding a ceramic felt is provided which is supported at an inner side by a corrugated insulating layer which forms said radial gap together with the lining.

* * * * *